United States Patent
Sayyed et al.

(10) Patent No.: US 11,989,300 B2
(45) Date of Patent: May 21, 2024

(54) FIRMWARE SECURE BOOT CUSTOMIZATION EXTENSIONS

(71) Applicant: Dell Products L.P., Round Rock, TX (US)

(72) Inventors: Ibrahim Sayyed, Georgetown, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 17/379,363

(22) Filed: Jul. 19, 2021

(65) Prior Publication Data

US 2023/0021213 A1 Jan. 19, 2023

(51) Int. Cl.
*G06F 21/57* (2013.01)
*G06F 21/31* (2013.01)

(52) U.S. Cl.
CPC ............ *G06F 21/572* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 5,953,502 A | * | 9/1999 | Helbig, Sr. ........... | G06F 9/3879 714/36 |
| 6,678,833 B1 | * | 1/2004 | Grawrock ............. | G06F 21/575 713/400 |
| 6,813,648 B1 | * | 11/2004 | Perona ................ | G06F 11/2284 710/60 |
| 9,189,285 B2 | * | 11/2015 | Ng ..................... | H04N 21/6125 |
| 9,886,282 B2 | * | 2/2018 | Canterbury ........... | G06F 21/572 |
| 2003/0135350 A1 | * | 7/2003 | Cheston ............... | G06F 21/572 702/186 |
| 2008/0045342 A1 | * | 2/2008 | Crowder, Jr. ......... | G06F 9/4403 717/176 |
| 2009/0280907 A1 | * | 11/2009 | Larsen ................. | G06F 8/60 463/42 |

(Continued)

OTHER PUBLICATIONS

Samsung SSD 950 PRO (White paper); Samsung; Nov. 2015 (Year: 2015).*

(Continued)

*Primary Examiner* — James R Turchen
(74) *Attorney, Agent, or Firm* — Jackson Walker L.L.P.

(57) ABSTRACT

An information handling system may include memory circuitry comprising a BIOS and a database including a first set of one or more cryptographic keys usable to authenticate code executable by the BIOS; and a physical storage medium other than the memory circuitry, wherein the physical storage medium includes a custom database including a second set of one or more cryptographic keys usable to authenticate code executable by the BIOS. The information handling system is configured to load a BIOS extension into the BIOS by: determining that the first set of one or more cryptographic keys does not include any key usable to authenticate the BIOS extension; determining that the second set of one or more cryptographic keys includes a particular key usable to authenticate the BIOS extension; authenticating the BIOS extension via the particular key; and in response to the authenticating, loading and executing the BIOS extension.

18 Claims, 6 Drawing Sheets

(56) References Cited

U.S. PATENT DOCUMENTS

| | | | |
|---|---|---|---|
| 2009/0300370 A1* | 12/2009 | Yao | G06F 12/145 |
| | | | 713/193 |
| 2010/0169633 A1* | 7/2010 | Zimmer | G06F 21/575 |
| | | | 713/189 |
| 2011/0029785 A1* | 2/2011 | Foster | H04L 63/06 |
| | | | 713/189 |
| 2012/0208619 A1* | 8/2012 | Canterbury | G06F 21/64 |
| | | | 463/25 |
| 2013/0104188 A1* | 4/2013 | Western | G06F 21/57 |
| | | | 726/1 |
| 2015/0074387 A1* | 3/2015 | Lewis | G06F 21/575 |
| | | | 713/2 |
| 2015/0379306 A1* | 12/2015 | Zimmer | G09C 1/00 |
| | | | 713/193 |
| 2016/0134505 A1* | 5/2016 | Crudele | H04L 47/83 |
| | | | 709/224 |
| 2016/0232356 A1* | 8/2016 | Barkelew | G06F 9/4401 |
| 2016/0378970 A1* | 12/2016 | Campbell | G06F 21/575 |
| | | | 726/17 |
| 2019/0363894 A1* | 11/2019 | Kumar Ujjwal | H04L 9/3268 |
| 2020/0042327 A1* | 2/2020 | Duncan | G06F 9/441 |
| 2020/0082091 A1* | 3/2020 | Areno | G06F 9/45558 |
| 2020/0159929 A1* | 5/2020 | Stewart | G06F 9/4401 |

OTHER PUBLICATIONS

Wilkins R, Richardson B. UEFI secure boot in modern computer security solutions. InUEFI forum Sep. 2013 (pp. 1-10). (Year: 2013).*

Cooper D, Polk W, Regenscheid A, Souppaya M. BIOS protection guidelines. NIST Special Publication. Apr. 2011;800:147. (Year: 2011).*

Unified Extensible Firmware Interface (UEFI) Specification; Mar. 2021; retrieved from: https://uefi.org/sites/default/files/resources/UEFI_Spec_2_9_2021_03_18.pdf (Year: 2021).*

* cited by examiner

FIRMWARE SECURE BOOT CUSTOMIZATION EXTENSIONS

TECHNICAL FIELD

The present disclosure relates in general to information handling systems, and more particularly to customizing Secure Boot extensions in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include firmware storage device storing a Basic Input/Output System (BIOS). Such a firmware storage device typically takes the form of a flash memory chip (e.g., a serial peripheral interface (SPI), an EEPROM chip, etc. For purposes of this disclosure, the terms "SPI" and "flash chip" may be understood to refer to any suitable type of solid-state storage that is used for storing BIOS code and/or data.

Due to size constraints on the flash chip, some information handling systems may also include firmware-based features that are not stored on the flash chip, but rather on another storage device such as a hard drive, USB storage device, or other physical storage resource. Moving such BIOS code off the flash chip can create a complication with code integrity measurements and trust chaining, however.

BIOS code that is executed from a location off the flash chip may need to be signed and verified using Secure Boot techniques, whereas BIOS code executing from the flash chip itself can utilize the integrated firmware integrity checks (trust chaining anchored to the manufacturer's root of trust). In some designs, the cryptographic keys that are used to sign the feature for code integrity verification may need to be included in the BIOS Secure Boot database (dB) to allow the BIOS to verify the image prior to execution.

The default Secure Boot keys may be included in the UEFI Secure Boot database using various mechanisms, such as being pre-built into the BIOS image during production (e.g., the default database), utilizing a signed update process through the operating system, or by manually inserting the keys into the database using some form of custom key management provided by the UEFI specification. Some implementations may limit the deployment of enhancements, since some customers require the use of their own custom key databases, and integration of additional keys are complicated to deploy in a secure manner.

Due to the way the Secure Boot key management is implemented, the insertion of the customer's keys typically causes challenges when a specific key for a manufacturer feature is required. For example, on Microsoft Windows platforms, one restriction is related to the use of Bitlocker recovery when the Secure Boot database is updated. This has the effect of limiting or restricting the inclusion of a manufacturer's value-added features with a customer's custom keys. This in turn may limit the manufacturer's ability to provide custom solutions for select customers, and it also limits customer options for implementing and deploying their own custom solution. In order to employ the custom Secure Boot database, a mechanism to support a Secure Boot customization of the Secure Boot default database without the need to update the BIOS firmware may be employed.

An additional complication is the size requirements for the Secure Boot databases. In some implementations, the Secure Boot databases are stores in the BIOS NVRAM on the platform flash storage device, which has a limited amount of space.

Thus it would be advantageous to enable the customization of the Secure Boot database to allow both manufacturer feature enhancements and entitlements, as well as enabling customers a more scalable solution for enabling their own solutions.

It is to be noted that various terms discussed herein (e.g., Secure Boot, etc.) are described in the UEFI Specification version 2.9, which was released in March 2021 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with customizing Secure Boot extensions in information handling systems may be reduced or eliminated.

In accordance with embodiments of the present disclosure, an information handling system may include memory circuitry comprising a BIOS and a database including a first set of one or more cryptographic keys usable to authenticate code executable by the BIOS; and a physical storage medium other than the memory circuitry, wherein the physical storage medium includes a custom database including a second set of one or more cryptographic keys usable to authenticate code executable by the BIOS. The information handling system is configured to load a BIOS extension into the BIOS by: determining that the first set of one or more cryptographic keys does not include any key usable to authenticate the BIOS extension; determining that the second set of one or more cryptographic keys includes a particular key usable to authenticate the BIOS extension; authenticating the BIOS extension via the particular key; and in response to the authenticating, loading and executing the BIOS extension.

In accordance with these and other embodiments of the present disclosure, a method may include an information handling system loading a Basic Input/Output System (BIOS) extension, wherein the information handling system includes: at least one processor; memory circuitry comprising a BIOS, wherein the memory circuitry further comprises a database including a first set of one or more cryptographic keys usable to authenticate code executable by the BIOS; and a physical storage medium other than the memory circuitry, wherein the physical storage medium includes a custom database including a second set of one or more cryptographic keys usable to authenticate code executable by the BIOS; wherein loading the BIOS extension includes: determining that the first set of one or more cryptographic keys does not include any key usable to authenticate the BIOS extension; determining that the second set of one or more cryptographic keys includes a particular key usable to authenticate the BIOS extension; authenticating the BIOS extension via the particular key; and in response to the authenticating, loading and executing the BIOS extension.

In accordance with these and other embodiments of the present disclosure, an article of manufacture may include a non-transitory, computer-readable medium having computer-executable code thereon that is executable by a processor of an information handling system, wherein the information handling system includes: memory circuitry comprising a Basic Input/Output System (BIOS), wherein the memory circuitry further comprises a database including a first set of one or more cryptographic keys usable to authenticate code executable by the BIOS; and a physical storage medium other than the memory circuitry, wherein the physical storage medium includes a custom database including a second set of one or more cryptographic keys usable to authenticate code executable by the BIOS; wherein the code is executable for loading a BIOS extension by: determining that the first set of one or more cryptographic keys does not include any key usable to authenticate the BIOS extension; determining that the second set of one or more cryptographic keys includes a particular key usable to authenticate the BIOS extension; authenticating the BIOS extension via the particular key; and in response to the authenticating, loading and executing the BIOS extension.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
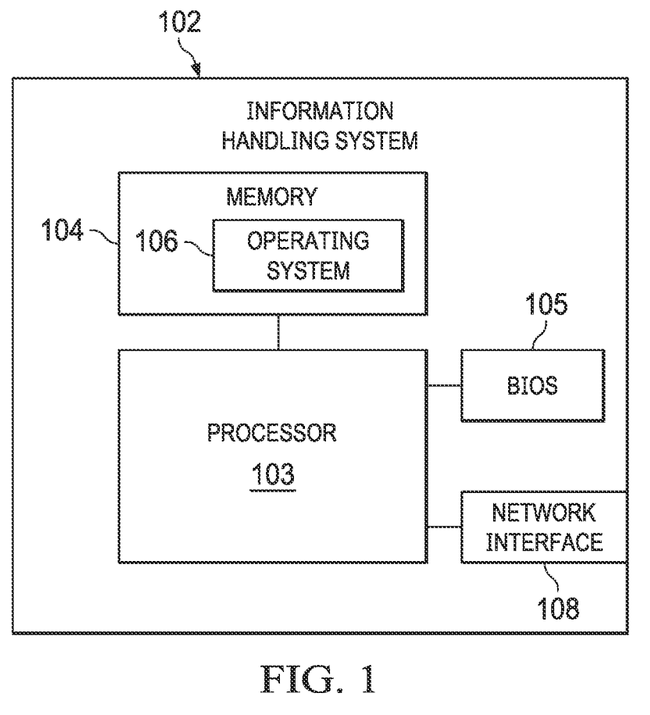
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, embodiments of this disclosure may enable the customization of the Secure Boot database. In order to support a platform extended firmware feature set, it is important to have a method which offers trust to load the code and/or data of BIOS 105 into the system memory with manufacturer-provided and/or customer-provided extended keys from a custom database while following the UEFI Secure Boot specification.

In some embodiments, a UEFI Secure Boot key management process may allow the secure insertion of Secure Boot keys into the Secure Boot database and provide a Secure Boot certificate database customization extension process. The customization process may allow customers and/or manufacturers to selectively include feature-specific custom Secure Boot keys into their own key databases. Embodiments may also allow the customization of a customer/manufacturer default database, based on feature entitlement.

Embodiments may enable customers to execute proprietary UEFI firmware code from outside of flash storage with their own Secure Boot database. This enables customers to run their pre-boot applications, boot loaders for operating systems, and other custom software securely.

Figure 2:
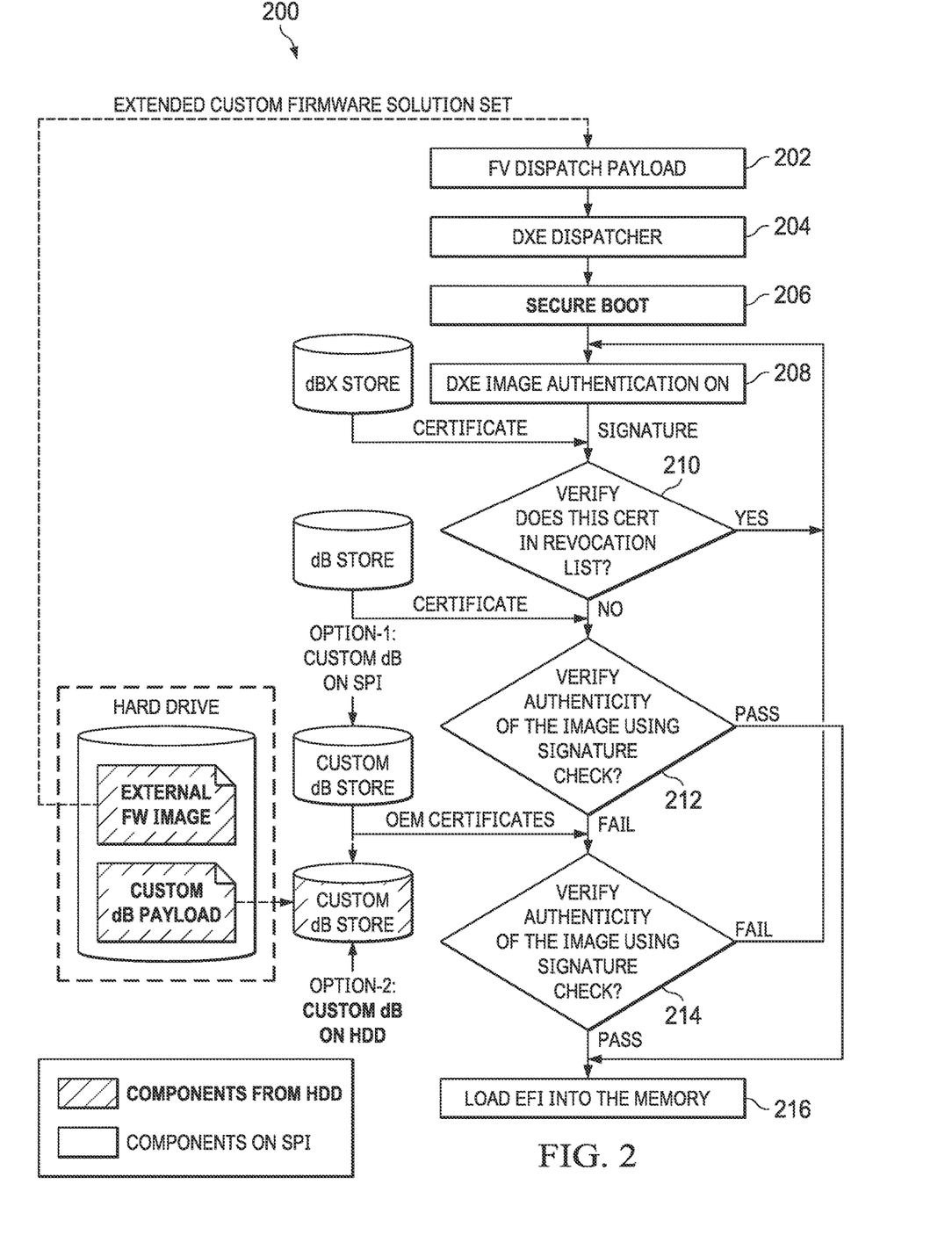
FIGS. 2-5 illustrate example process flows, in accordance with embodiments of the present disclosure.

Some embodiments may include two major components, as discussed in further detail herein. Briefly, however, the first component may comprise firmware Secure Boot certificate database extensions, which may allow for the following features:

Extended Database
    Extended Database binding to the platform
    Extended Database signing
    Customer Extended Database usage
        Extended Database trust chaining to platform Root-of-Trust, including verification prior to Extended database use
        Firmware verification flows utilizing Extended Database The second major component may include firmware Secure Boot customization injection, which may allow for the following features:

Customized Secure Boot Certificate Injection process
    Factory entitlements vs customer enablement
    Customization protocols
        Entitlement Tokens
        Security Version Turning now to FIG. 2, a flow chart is shown of an example method 200 for loading an external custom firmware image, in accordance with some embodiments of this disclosure.

At a high level, method 200 illustrates a process for ensuring that the custom firmware image is not restricted by the dBx store (a key blocklist), and checking to see if it is allowed by the dB store or custom dB store (key allowlists). This may be accomplished in some embodiments by using a custom key set by following the UEFI Secure Boot specification. The components may include a custom solution set (also referred to as the Extended Custom Firmware Solution Set) which resides in the hard drive or other any other off-flash physical storage medium such as a solid-state drive, etc. (For purposes of this disclosure, the term "hard drive" should be understood to include any such medium.) The custom dB payload stored off-flash may include a set of OEM keys, custom key store signature information, and the signatures themselves.

The UEFI Secure Boot database certificates may reside on the SPI flash used to perform image verification flow with dB and dBx. A custom dB may be included as an extension to the UEFI Secure Boot dB. In various embodiments, the custom dB may be stored on the SPI flash (shown in FIG. 2 as Option 1) or retrieved from the hard drive (shown as Option 2). If retrieved from the hard drive, then the custom dB may be verified with a platform key and Secure Boot keys before being used.

At steps 202, 204, and 206, the UEFI BIOS code locates the signed extended firmware volume (FV) from the non-SPI space (e.g., the hard drive). At step 208, the DXE phase of boot performs image authentication based on the signature of the firmware volume. In particular, at step 210, the method may include verifying that the certificate associated with the custom FV is not in the dBx blocklist. At step 212, the method may include checking the signature of the custom FV against the standard dB store. And at step 214, if the signature cannot be verified against the standard dB store, it may be verified against the custom dB store.

If the authenticity is verified, then the volume may be loaded into memory and executed at step 216.

At any point during the verification process, if the extended custom dB and custom solution set signature verification fails, then the BIOS security logic may return an error status to indicate that the UEFI image verification has failed.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

In some embodiments, the extension features described herein may include both a process to build the Secure Boot certificate database extensions, as well as a process for authentication of an external custom Secure Boot database via the firmware chain of trust. These processes are described in more detail below.

Regarding building the Secure Boot certificate database extensions, when a customer or platform manufacturer is ready to deploy the custom features into the platform, they may need to add the custom key sets as a Secure Boot certificate database extension to verify the custom solution sets. Custom key pairs may be signed with the platform manufacturer's signing process in order to approve the usage. These custom key pairs may be signed with the UEFI Secure Boot keys and platform keys. The UEFI Secure Boot keys may be used for Secure Boot compliance on the image execution, and the platform key may be used to allow the custom solutions to be loaded into the respective platform hardware.

Figure 3:
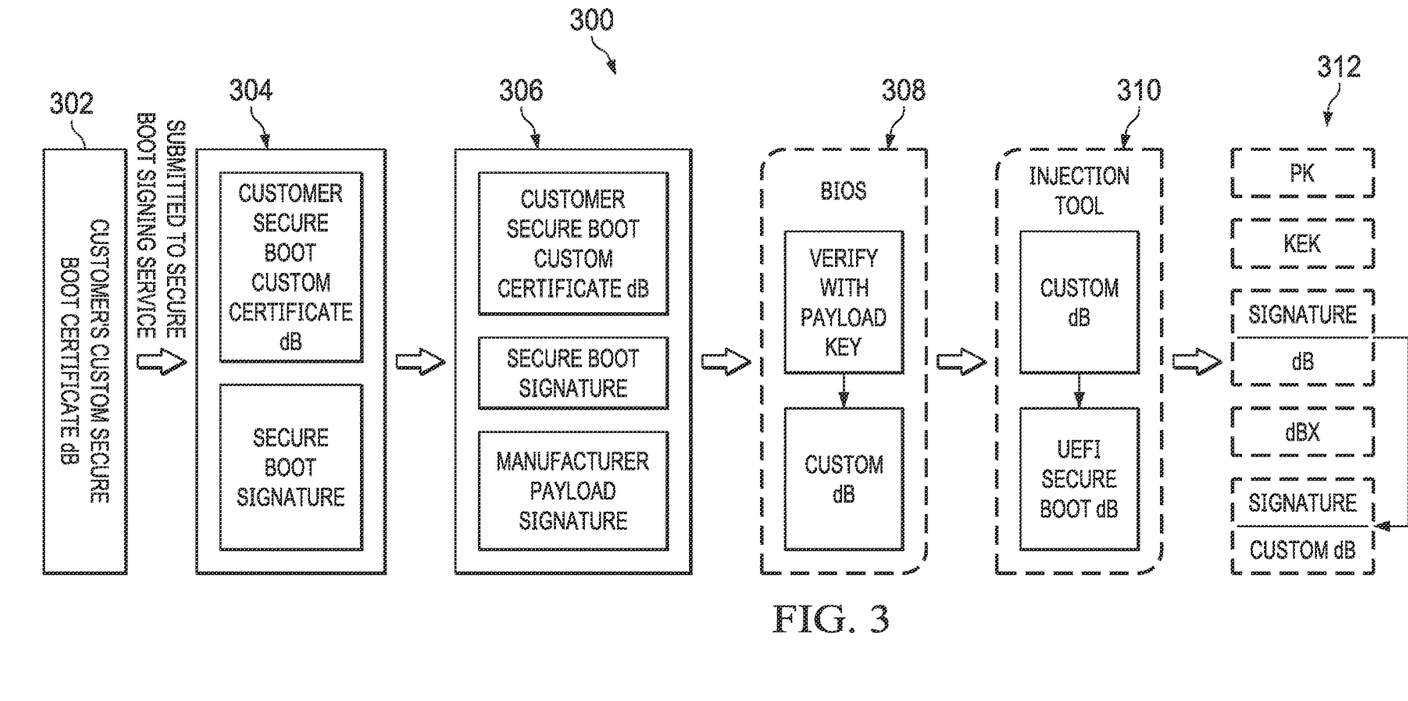

Turning now to FIG. 3, a flow chart is shown of an example method 300 for building Secure Boot certificate database extensions, in accordance with some embodiments of this disclosure.

At step 302, a customer/OEM may submit their custom certificates for signing to the manufacturer/OEM server. At step 304, the server may sign the custom certificate dB with the UEFI Secure Boot keys. At step 306, the server may also sign the custom certificate dB with manufacturer platform keys.

At step 308, the custom Secure Boot dB may be inserted onto the BIOS firmware storage device or external media. At step 310, an injection tool may inject the custom dB payload into the UEFI Secure Boot dB as a dB extension (e.g., on the SPI). Alternatively, in the embodiment referred to as Option 2 and shown in FIG. 2, if the customer desires to create and maintain a custom dB, it can also be saved off-SPI (e.g., on the hard drive). At step 312, the custom Secure Boot dB may be verified with the onboard Secure Boot certificate before being used.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Figure 4A:
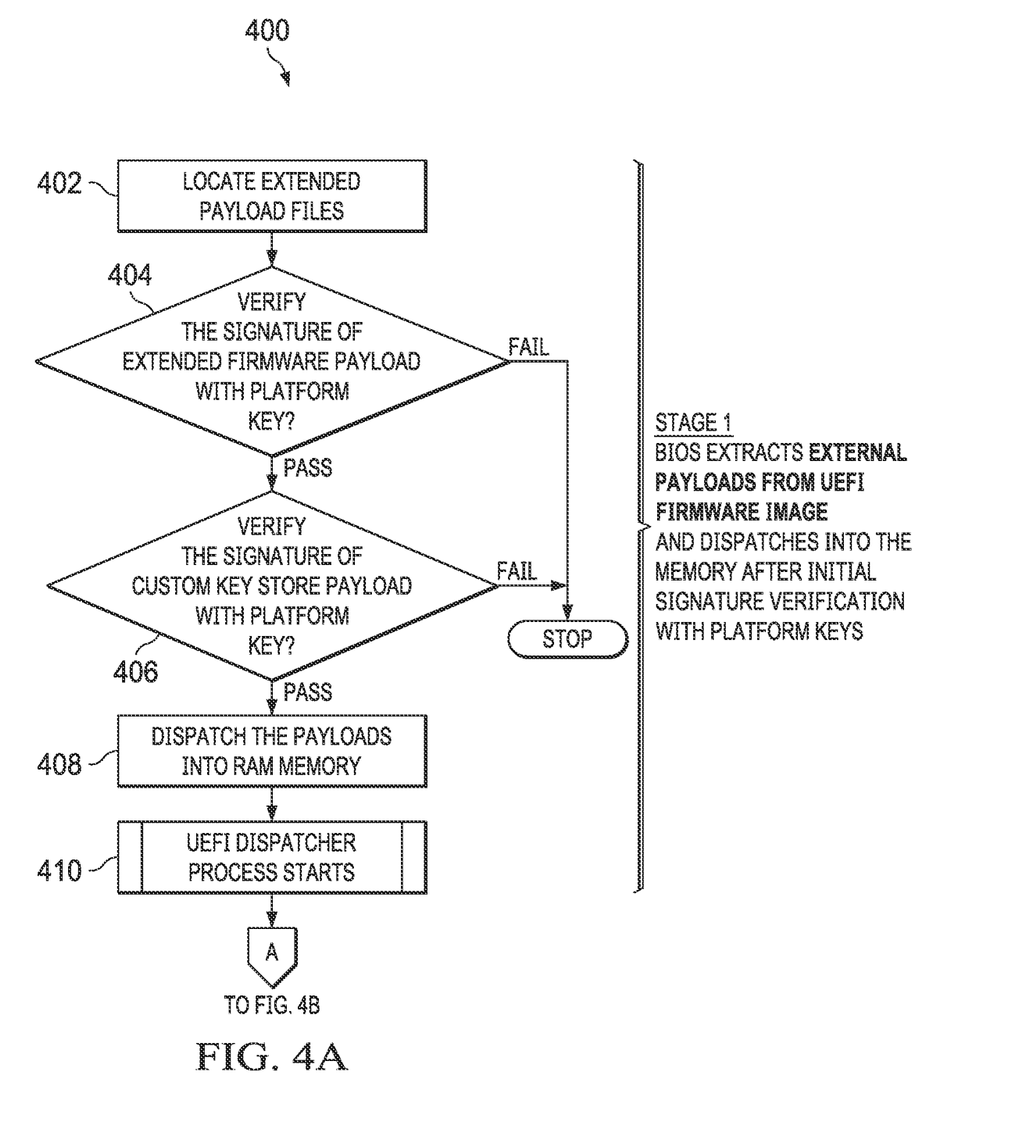
Figure 4B:
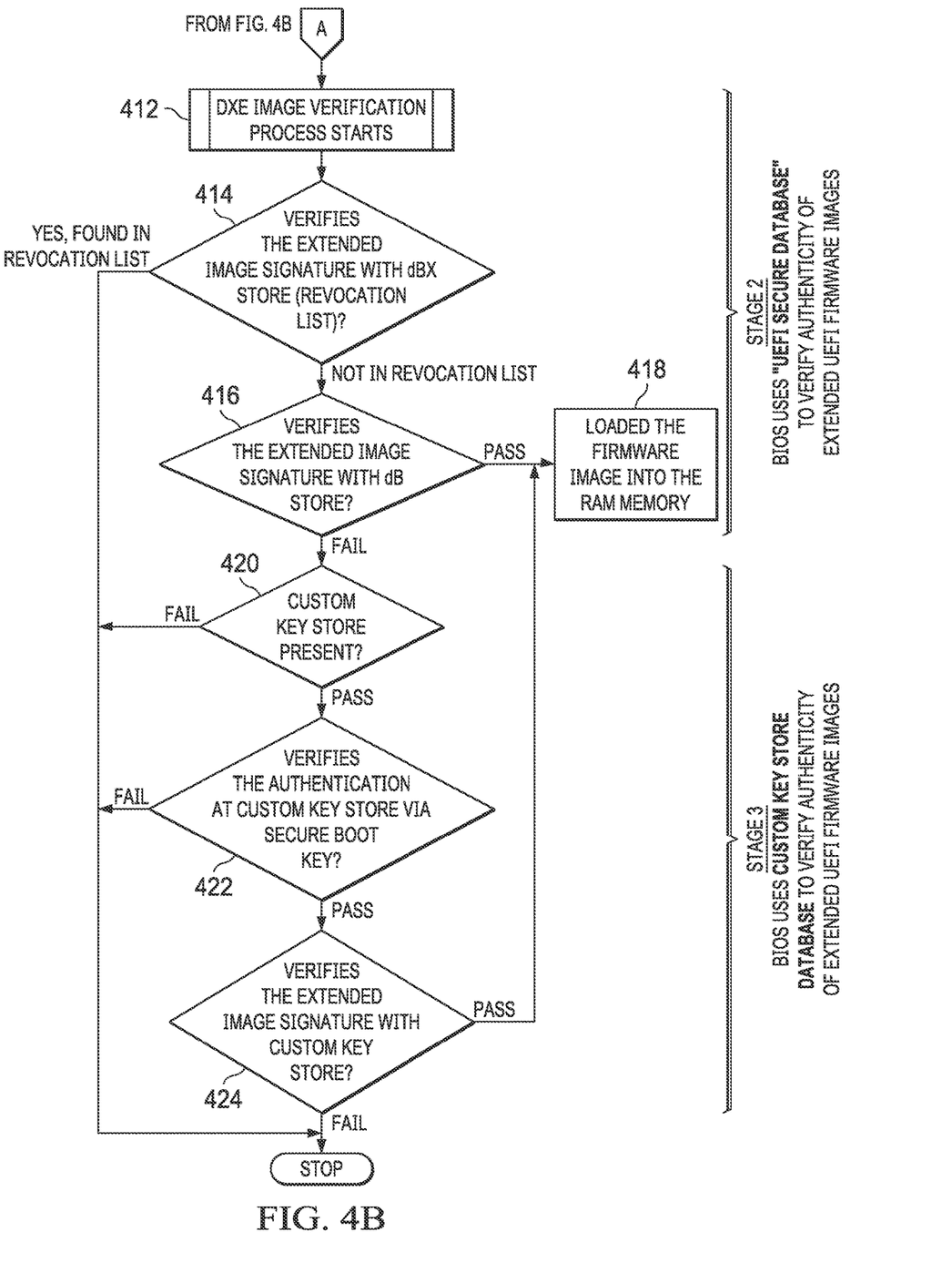

Turning now to FIGS. 4A and 4B, a flow chart is shown of an example method 400 for authentication of external custom Secure Boot database via firmware chain of trust rooted custom Secure Boot payload, in accordance with some embodiments of this disclosure.

Method 400 may proceed in three stages, as shown. In Stage 1, the method begins at step 402, in which the BIOS locates the signed extended firmware payload (e.g., from off-SPI storage). At steps 404 and 406, the method includes verifying the signed extended firmware payload using platform keys. Upon successful verification, the firmware payload may be dispatched into system memory at step 408. If a custom key store payload is available on the hard drive, it may also be verified using the platform keys. At step 412, the DXE image verification process may begin.

In Stage 2, per the UEFI BIOS Secure Boot specification, the image may begin the firmware execution authentication process using UEFI Secure Boot database keys at step 412. First, the Secure Boot forbidden signature database (dBx) keys may be checked at step 414. This is to make sure any application or driver signed by a revoked key will be blocked from execution. Then at step 416, the authorized database (dB) keys may be checked to verify the authenticity of the firmware image. Upon successful verification, the image may be loaded into system memory at step 418.

If the firmware image authenticity check cannot be completed with the dB keys, the BIOS may then look for the existence of a custom dB store in the system at step 420.

In Stage 3, the BIOS locates the signed custom dB store, verifies the signature with UEFI Secure Boot keys at step 422, and uses it for the custom solution set image verification at step 424.

Upon successful validation of the custom key store database with the dB keys, the BIOS may repeat the signature verification of the extended custom solution set with the custom database certificates and install the image into system memory once verified.

One of ordinary skill in the art with the benefit of this disclosure will understand that the preferred initialization point for the method depicted in FIGS. 4A and 4B and the order of the steps comprising that method may depend on the implementation chosen. In these and other embodiments, this method may be implemented as hardware, firmware, software, applications, functions, libraries, or other instructions. Further, although FIGS. 4A and 4B disclose a particular number of steps to be taken with respect to the disclosed method, the method may be executed with greater or fewer steps than depicted. The method may be implemented using any of the various components disclosed herein (such as the components of FIG. 1), and/or any other system operable to implement the method.

The Secure Boot customization extension injection process according to embodiments of this disclosure is a mechanism that may be used to provide Secure Boot customization for the product at time of production, as well as a method for customers to enable customization for their specific solution.

A factory customization process may support feature entitlement. As discussed in further detail below, the Secure Boot customization injection feature may include a BIOS customization driver, one or more customization packets, customization controls, customization tools, and customization payload generation and signing.

Figure 5:
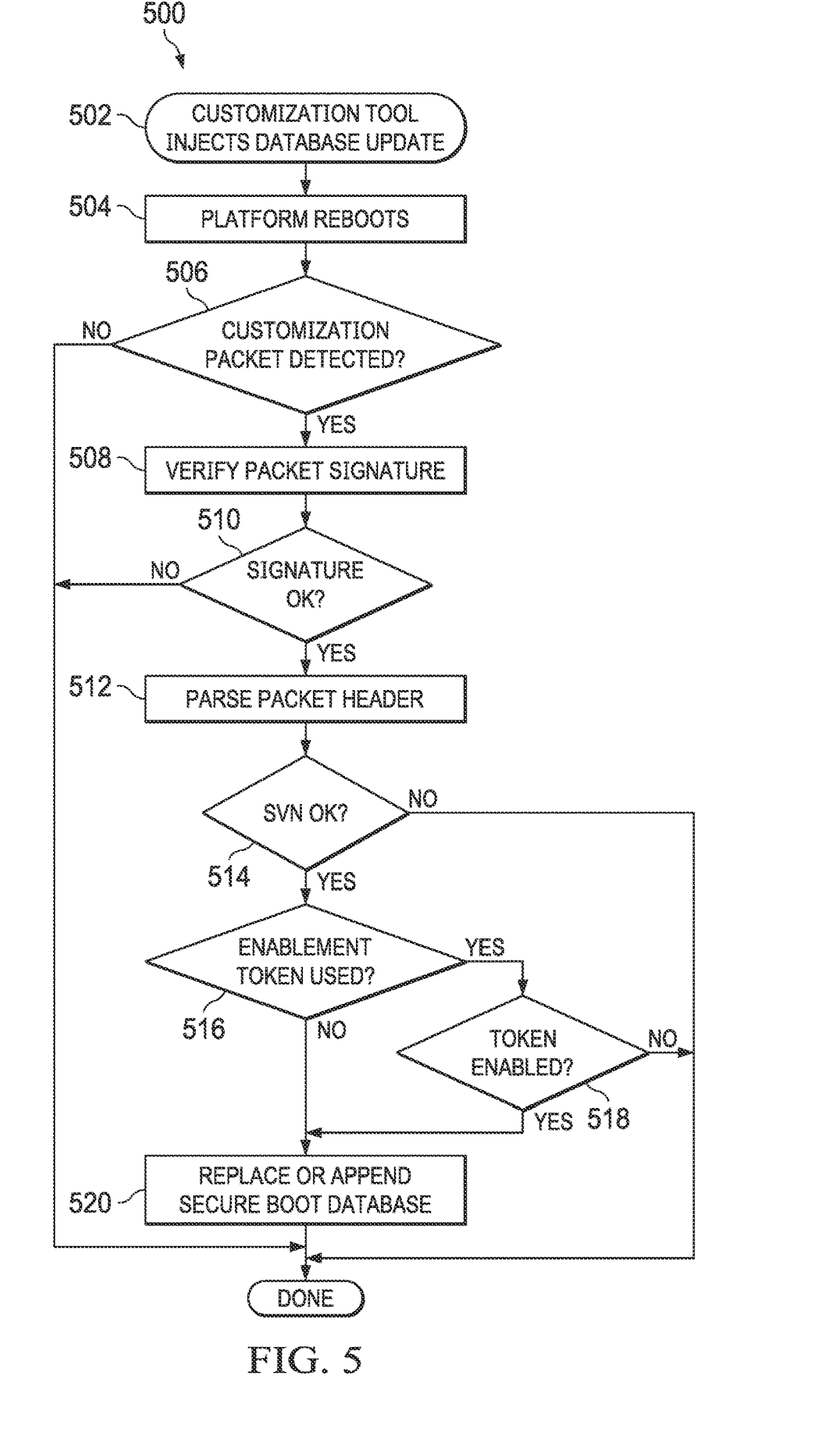

Turning now to FIG. 5, a flow chart is shown of an example method 500 for a customization injection process, in accordance with some embodiments of this disclosure.

At step 502, the customization tool may inject a database update, and the platform may be rebooted at step 504. At step 506, the customization BIOS driver may detect the presence of a customization packet. On the first reboot after the customization packet insertion, the driver may first verify the signature of the packet at step 508.

The driver may then parse the packet header at step 512 to ensure that the packet is applicable to the platform on which it is executing. If so, then the driver may next verify that the packet is not revoked by comparing the security version number (SVN) with the SVN stored in BIOS.

At step 516, the driver may locate the Enablement Token defined in the header and compare it to the setting on the platform. If the setting is supported and enabled (e.g., via a factory enablement flag), then the driver may locate the payload and interpret the key injection parameters (e.g., append or replace), and then either append or replace the applicable Secure Boot variables as appropriate at step 520.

One of ordinary skill in the art with the benefit of this disclosure will understand that the preferred initialization point for the method depicted in FIG. 5 and the order of the steps comprising that method may depend on the implementation chosen. In these and other embodiments, this method may be implemented as hardware, firmware, software, applications, functions, libraries, or other instructions. Further, although FIG. 5 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

The customization driver discussed with reference to FIG. 5 may be a BIOS driver that is built into the UEFI BIOS to support the customization feature. The driver may perform various operations, in some embodiments including without limitation:

Packet detection
    Packet security verification (e.g., signature verification, SVN confirmation)
    FV writing of packet to firmware storage device (on-SPI)
        FV store location may be altered via a customization driver parameter (i.e. via a BIOS policy)
    Platform controls comparisons (e.g., System ID, Service Tag, Enablement Token)
    Parse payload operations
        Append/Replace
        Modified variables (platform key (PK), key exchange key (KEK), dB, dBx)
    Perform Secure Boot variable updates
    Completion flag tracking
    Invalid or untrusted packet deletion The customization packet may include the customization payload, as well as a header with platform-specific information. The payload may include the Secure Boot keys that will be inserted into (or replace) the certificates and/or hashes in specific Secure Boot variables such as PK, KEK, dB, and dBx.

The packet may also include a header with data and settings information to control the applicability of the payload, the Secure Boot variable customization operations, the pertinent enablement token (e.g., factory flags) and various system behaviors.

The customization packet header may include fields to control the behavior of the payload contents, and the application of the payload on the platform. This may be accomplished through the controls described below, in one embodiment. In this embodiment, various controls are marked as optional or mandatory, but one of ordinary skill in the art with the benefit of this disclosure will understand that various other schemes are possible. The following is just one example of a packet header layout that may be used in some instances.

System ID/BIOS ID (Optional)
    A list of the applicable platform ID(s) to identify on which platforms the payload can be used, which may be left blank to indicate no such restrictions.
Service Tag (Optional)
    A customization packet can be designated for use on a specific platform identified through service tag, which may be left blank to indicate no such restrictions.
Enablement Token/Attribute (Optional)
    The customization payload may be supported only on platforms that are configured to support a specific custom solution. There may be an enablement attribute assigned on the platform for this. This field may be used to compare with the enablement in BIOS. If the enablement is not set, then payload would not be used.
Security Version Number (Mandatory)
    The SVN is a numeric value used to indicate revocation of previously released customization payloads.
    This may serve as a mitigation against use of outdated or vulnerable Customization payloads.
    The SVN may be included in both the customization payload, as well as the customization driver in the BIOS.

The enablement token mentioned above may be referenced by an optional value that is used to control the use and entitlements of a customization payload. This is typically dependent on a specific feature that is allowed to be supported on the platform. The enablement token is a value that may be stored on the platform BIOS (e.g., either at build-time or runtime). In some embodiments, it may be a non-volatile variable stored in BIOS NVRAM. For factory integration of a specific feature, it may be hardcoded in a code module that is associated with a feature enablement.

Depending on the feature, for factory integration, setting the enablement token can be restricted by the use of a manufacturing modes to prevent unauthorized use of the feature and the associated Secure Boot customizations. For example, the enablement token may be set during a customization phase manufacturing mode.

If the enablement token is set on the platform, the customization driver may compare the it to the enablement token in the payload. If the enablement token is also in the payload, the customization payload is authorized for use on the platform. If the enablement token is set in the customization payload but not enabled on the platform, then the customization payload is not authorized to be used on the platform.

As noted above, an SVN may be used to indicate revocation of previously released payloads. If there is a reason to revoke a previously released customization payload, then the customization driver SVN may be incremented and released in an updated platform BIOS revision. The SVN may be compared during any of various circumstances, such as at the time of the insertion of the customization payload. If the customization payload was not yet applied to the platform, then the comparison may take place immediately before the customization payload is applied.

A customization tool may be used to inject the customization packet onto the platform. In one embodiment, it may be implemented as an executable that may be run from the OS or UEFI that contains the customization packet. The tool is executed and deposits the customization packet into memory.

The tool payload may be signed to prevent unauthorized payloads from being loaded into the FV. The payload may also be signed for verification after it is inserted in the FV, prior to execution by the BIOS.

Upon reboot, the customization driver may perform signature verification, as well as platform verification (based on packet header data) of the packet. The customization driver may also detect the presence of a Customization Token and set to the correct (enabled) state. If successful, the packet in memory may be written to the applicable FV storage location. If the packet is rejected, then the packet is not written to the FV.

As discussed herein, various embodiments of this disclosure may provide several advantages. For example, the Secure Boot certificate extension allows going beyond the integrated Secure Boot default databases. This provides for the use of customer-, factory-, and platform-specific customization of Secure Boot default certificate database. Secure Boot customization may be controlled based on manufacturer feature entitlement in some embodiments as well.

A mechanism to extend the Secure Boot database via customer customization payload and services is also provided. Customers may be enabled to configure external custom Secure Boot database extensions. The external custom Secure Boot database may be authenticated via a firmware chain of trust rooted OEM Secure Boot payload. Trust chaining may also bind the custom Secure Boot database to the BIOS Core Root of Trust for Measurement (CRTM) authentication and integrated Secure Boot dB certificate. The chain of trust may be extended from an off-host custom Secure Boot authentication service to platform Secure Boot verification of custom certificate to the custom Secure Boot database, in some embodiments.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   memory circuitry comprising a Basic Input/Output System (BIOS), wherein the memory circuitry further comprises a database including a first set of one or more cryptographic keys usable to authenticate first code that is executable by the BIOS by verifying one or more first cryptographic signatures associated with the first code; and
   a physical storage medium other than the memory circuitry, wherein the physical storage medium includes a custom database including a second set of one or more cryptographic keys usable to authenticate second code that is executable by the BIOS by verifying one or more second cryptographic signatures associated with the second code;
   wherein the information handling system is configured to load a BIOS extension into the BIOS by:
   determining that the first set of one or more cryptographic keys stored in the memory circuitry does not include any key usable to authenticate the BIOS extension;
   determining that the second set of one or more cryptographic keys stored in the physical storage medium includes a particular key usable to authenticate the BIOS extension;
   authenticating the BIOS extension via the particular key; and
   in response to the authenticating, loading and executing the BIOS extension.

2. The information handling system of claim 1, wherein the physical storage medium comprises a hard drive and/or a solid-state drive.

3. The information handling system of claim 1, wherein the BIOS is a Unified Extensible Firmware Interface (UEFI) BIOS.

4. The information handling system of claim 1, wherein the information handling system is further configured to:
determine that the BIOS extension is associated with a key in a forbidden signature database; and
prevent loading of the BIOS extension.

5. The information handling system of claim 4, wherein the forbidden signature database is located on the memory circuitry.

6. The information handling system of claim 1, wherein a Core Root of Trust for Measurement (CRTM) associated with the BIOS is usable to authenticate the custom database.

7. A method comprising:
an information handling system loading a Basic Input/Output System (BIOS) extension, wherein the information handling system includes:
at least one processor;
memory circuitry comprising a BIOS, wherein the memory circuitry further comprises a database including a first set of one or more cryptographic keys usable to authenticate first code that is executable by the BIOS by verifying one or more first cryptographic signatures associated with the first code; and
a physical storage medium other than the memory circuitry, wherein the physical storage medium includes a custom database including a second set of one or more cryptographic keys usable to authenticate second code that is executable by the BIOS by verifying one or more second cryptographic signatures associated with the second code;
wherein loading the BIOS extension includes:
determining that the first set of one or more cryptographic keys stored in the memory circuitry does not include any key usable to authenticate the BIOS extension;
determining that the second set of one or more cryptographic keys stored in the physical storage medium includes a particular key usable to authenticate the BIOS extension;
authenticating the BIOS extension via the particular key; and
in response to the authenticating, loading and executing the BIOS extension.

8. The method of claim 7, wherein the physical storage medium comprises a hard drive and/or a solid-state drive.

9. The method of claim 7, wherein the BIOS is a Unified Extensible Firmware Interface (UEFI) BIOS.

10. The method of claim 7, further comprising:
prior to loading and executing the BIOS extension, determining that the BIOS extension is not associated with a key in a forbidden signature database.

11. The method of claim 10, wherein the forbidden signature database is located on the memory circuitry.

12. The method of claim 7, wherein a Core Root of Trust for Measurement (CRTM) associated with the BIOS is usable to authenticate the custom database.

13. An article of manufacture comprising a non-transitory, computer-readable medium having computer-executable code thereon that is executable by a processor of an information handling system, wherein the information handling system includes:
memory circuitry comprising a Basic Input/Output System (BIOS), wherein the memory circuitry further comprises a database including a first set of one or more cryptographic keys usable to authenticate first code that is executable by the BIOS by verifying one or more first cryptographic signatures associated with the first code; and
a physical storage medium other than the memory circuitry, wherein the physical storage medium includes a custom database including a second set of one or more cryptographic keys usable to authenticate second code that is executable by the BIOS by verifying one or more second cryptographic signatures associated with the second code;
wherein the code is executable for loading a BIOS extension by:
determining that the first set of one or more cryptographic keys stored in the memory circuitry does not include any key usable to authenticate the BIOS extension;
determining that the second set of one or more cryptographic keys stored in the physical storage medium includes a particular key usable to authenticate the BIOS extension;
authenticating the BIOS extension via the particular key; and
in response to the authenticating, loading and executing the BIOS extension.

14. The article of claim 13, wherein the physical storage medium comprises a hard drive and/or a solid-state drive.

15. The article of claim 13, wherein the BIOS is a Unified Extensible Firmware Interface (UEFI) BIOS.

16. The article of claim 13, wherein the information handling system is further configured to:
determine that the BIOS extension is associated with a key in a forbidden signature database; and
prevent loading of the BIOS extension.

17. The article of claim 16, wherein the forbidden signature database is located on the memory circuitry.

18. The article of claim 13, wherein a Core Root of Trust for Measurement (CRTM) associated with the BIOS is usable to authenticate the custom database.

* * * * *